(12) United States Patent
Anderson

(10) Patent No.: US 8,596,151 B2
(45) Date of Patent: Dec. 3, 2013

(54) MOMENTUM EXCHANGE ASSEMBLIES AND INNER GIMBAL ASSEMBLIES FOR USE IN CONTROL MOMENT GYROSCOPES

(75) Inventor: Jane Anderson, Springerville, AZ (US)

(73) Assignee: Honeywell International Inc., Morristown, NJ (US)

( * ) Notice: Subject to any disclaimer, the term of this patent is extended or adjusted under 35 U.S.C. 154(b) by 1143 days.

(21) Appl. No.: 12/714,213

(22) Filed: Feb. 26, 2010

(65) Prior Publication Data

US 2011/0209568 A1 Sep. 1, 2011

(51) Int. Cl.
*G01C 19/02* (2006.01)

(52) U.S. Cl.
USPC .......................................................... 74/5.22

(58) Field of Classification Search
USPC ......... 74/5.22, 5.34, 5.37, 5.7, 5.95; 384/476, 384/900
See application file for complete search history.

(56) References Cited

U.S. PATENT DOCUMENTS

| | | | |
|---|---|---|---|
| 2,330,121 A | 9/1943 | Heintz | |
| 3,208,155 A | 9/1965 | Summers | |
| 3,818,255 A | 6/1974 | Wagner | |
| 5,236,306 A | 8/1993 | Hozak | |
| 6,373,158 B1 | 4/2002 | Hsu et al. | |
| 6,959,756 B2 | 11/2005 | Woodard et al. | |
| 7,064,463 B2 | 6/2006 | Matin et al. | |
| 7,227,286 B2 | 6/2007 | Kudo et al. | |
| 7,337,606 B2 * | 3/2008 | Brouillette et al. | 60/39.35 |
| 7,417,344 B2 * | 8/2008 | Bradfield | 310/90 |
| 7,443,064 B2 | 10/2008 | Kihara et al. | |
| 7,540,663 B2 | 6/2009 | Yum et al. | |
| 7,546,782 B2 | 6/2009 | Adams et al. | |
| 8,312,782 B2 * | 11/2012 | McMickell et al. | 74/5.37 |
| 2005/0040776 A1 | 2/2005 | Sibley | |
| 2007/0157749 A1 | 7/2007 | Adams et al. | |

FOREIGN PATENT DOCUMENTS

JP 1299411 A 12/1989

* cited by examiner

*Primary Examiner* — Troy Chambers
*Assistant Examiner* — Michael Gonzalez
(74) *Attorney, Agent, or Firm* — Ingrassia Fisher & Lorenz, P.C.

(57) ABSTRACT

An inner gimbal assembly is provided for use in a control moment gyroscope assembly and of the type that includes a stator housing and a spin motor disposed within the stator housing and on a shaft. The inner gimbal assembly comprises a first spin bearing mounted to the shaft, and a bearing cartridge substantially surrounding the first spin bearing, the bearing cartridge having a first end partially defining a first end cavity, a second end partially defining a first intermediary cavity, and a bearing cartridge channel providing flow communication between the first end cavity and the first intermediary cavity.

20 Claims, 4 Drawing Sheets ions rights in the inventive subject matter

MOMENTUM EXCHANGE ASSEMBLIES AND INNER GIMBAL ASSEMBLIES FOR USE IN CONTROL MOMENT GYROSCOPES

STATEMENT REGARDING FEDERALLY SPONSORED RESEARCH OR DEVELOPMENT

The inventive subject matter was made with Government support under Government Contract Number FA9453-08-C-0247 awarded by the Air Force. The Government has certain rights in the inventive subject matter

TECHNICAL FIELD

The inventive subject matter generally relates to momentum exchange assemblies, and more particularly relates to inner gimbal assemblies for use in control moment gyroscopes.

BACKGROUND

Control moment gyroscopes (CMGs) are commonly employed in satellite attitude control systems. Generally, CMGs include an inner gimbal assembly (IGA) supported by a CMG housing or a stator housing. The IGA typically includes a rotor assembly comprised of an inertial element (e.g., a ring or cylinder) coupled to a shaft. The rotor may be coupled to a spin motor, which allows momentum to be stored in the CMG. To permit the rotor to rotate about a spin axis, spin bearings may be disposed at either end of the shaft. To selectively rotate the IGA about a gimbal axis orthogonal to the rotor spin axis, a torque module assembly (TMA) is mounted to a first end portion of the stator housing. In this way, an output torque is produced that is orthogonal to the rotor spin axis and proportional to the gimbal rate. The TMA may further include one or more rotation sensors (e.g., a tachometer, a resolver, etc.) suitable for monitoring the rotational rate, commutation, and/or the angular position of the inner gimbal assembly. A signal module assembly (SMA) may be mounted to a second end portion of the stator housing opposite the TMA. The SMA functions to deliver electrical signals and power across the rotary interface to the electrical components of the IGA assembly (e.g., the spin motor and electronics). Typically, the CMG housing is evacuated to provide a vacuum environment for the IGA.

As the CMG operates, the temperature within the CMG housing may increase. Over time, the temperature within the CMG housing may exceed an acceptable threshold. As a result, temperature-sensitive components, such as the spin bearings and/or the spin motor, may have shortened useful lives. Although fans and other cooling components have been employed in the past to cool temperature-sensitive components, these cooling configurations may be improved. Specifically, the addition of fans and other cooling components to the CMG may add weight, which may hinder improvements to CMG efficiency. Additionally, because the additional cooling components may consume a volume of space within the CMG, other components of the CMG may need to be reconfigured or repositioned within the CMG, which may increase cost and design complexity of the CMG.

Accordingly, it would be desirable to provide an improved CMG having a cooling system for maintaining an interior temperature below a threshold temperature. In particular, it would be desirable for the CMG to have a relatively low overall weight and for the cooling system to occupy a minimal portion of the CMG interior volume. Moreover, it would be desirable for the improved CMG to be relatively simple and inexpensive to manufacture. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Momentum exchange assemblies and inner gimbal assemblies for use in control moment gyroscopes are provided.

In an embodiment, by way of example only, a moment exchange assembly includes an outer housing and an inner gimbal assembly. The inner gimbal assembly is disposed within the outer housing and includes a stator housing, a rotor assembly, a first spin bearing, a bearing cartridge, and a spin motor. The rotor assembly is disposed at least partially within the stator housing. The rotor assembly includes a shaft and an inertial element fixedly coupled to the shaft. The first spin bearing is mounted to a first end of the shaft. The bearing cartridge surrounds the first spin bearing and has a first end, a second end, and a bearing cartridge channel extending from the first end of the bearing cartridge to the second end of the bearing cartridge. The spin motor is disposed within the stator housing and around the shaft and includes a spin motor rotor and a spin motor stator. The spin motor rotor is coupled to the rotor assembly, and the spin motor stator is disposed around a portion of the spin motor rotor and coupled to the stator housing. A first end cavity is partially defined by the first end of the bearing cartridge. A first intermediary cavity is defined by a first portion of an outer surface of the spin motor, a first portion of a surface of the rotor assembly, and the second end of the bearing cartridge. The bearing cartridge channel provides flow communication between the first end cavity and the first intermediary cavity.

In another embodiment, by way of example only, a moment exchange assembly includes an outer housing and an inner gimbal assembly disposed within the outer housing. The inner gimbal assembly includes a stator housing, a rotor assembly disposed at least partially within the stator housing, the rotor assembly including a shaft and an inertial element fixedly coupled to the shaft, a spin bearing mounted to a first end of the shaft, a diaphragm surrounding the spin bearing, the diaphragm having a first end, a second end, and a spin motor disposed within the stator housing and around the shaft, the spin motor including a spin motor rotor and a spin motor stator, the spin motor rotor including an inner ring and an outer ring, the inner ring coupled to the shaft, the outer ring coupled to the inertial element, and the spin motor stator disposed in an annular gap between the inner ring and the outer ring and coupled to the stator housing. A first end cavity is partially defined by the first end of the bearing cartridge. The shaft includes a first shaft channel extending through the shaft. An intermediary cavity is defined by a portion of the outer surface of the spin motor and a portion of the surface of the rotor assembly. The first shaft channel provides flow communication between the first end cavity and the intermediary cavity.

In another embodiment, by way of example only, an inner gimbal assembly is provided for use in a control moment gyroscope assembly and of the type that includes a stator housing and a spin motor disposed within the stator housing and on a shaft. The inner gimbal assembly comprises a first spin bearing mounted to the shaft, and a bearing cartridge substantially surrounding the first spin bearing, the bearing cartridge having a first end partially defining a first end cavity, a second end partially defining a first intermediary cavity, and a bearing cartridge channel providing flow communication between the first end cavity and the first intermediary cavity.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

An improved control moment gyroscope (CMG) is provided that includes a mechanism for cooling components within the CMG. In an embodiment, the mechanism includes channels that are formed through a diaphragm and/or shaft of the CMG. The channels are employed to increase convection within the CMG, which may reduce temperature gradients between different locations within the CMG. As a result, areas previously known to have temperature measurements exceeding a threshold temperature value may be cooled. Additionally, temperature measurements of heat-producing components within the CMG may be maintained below a threshold temperature.

Figure 1:
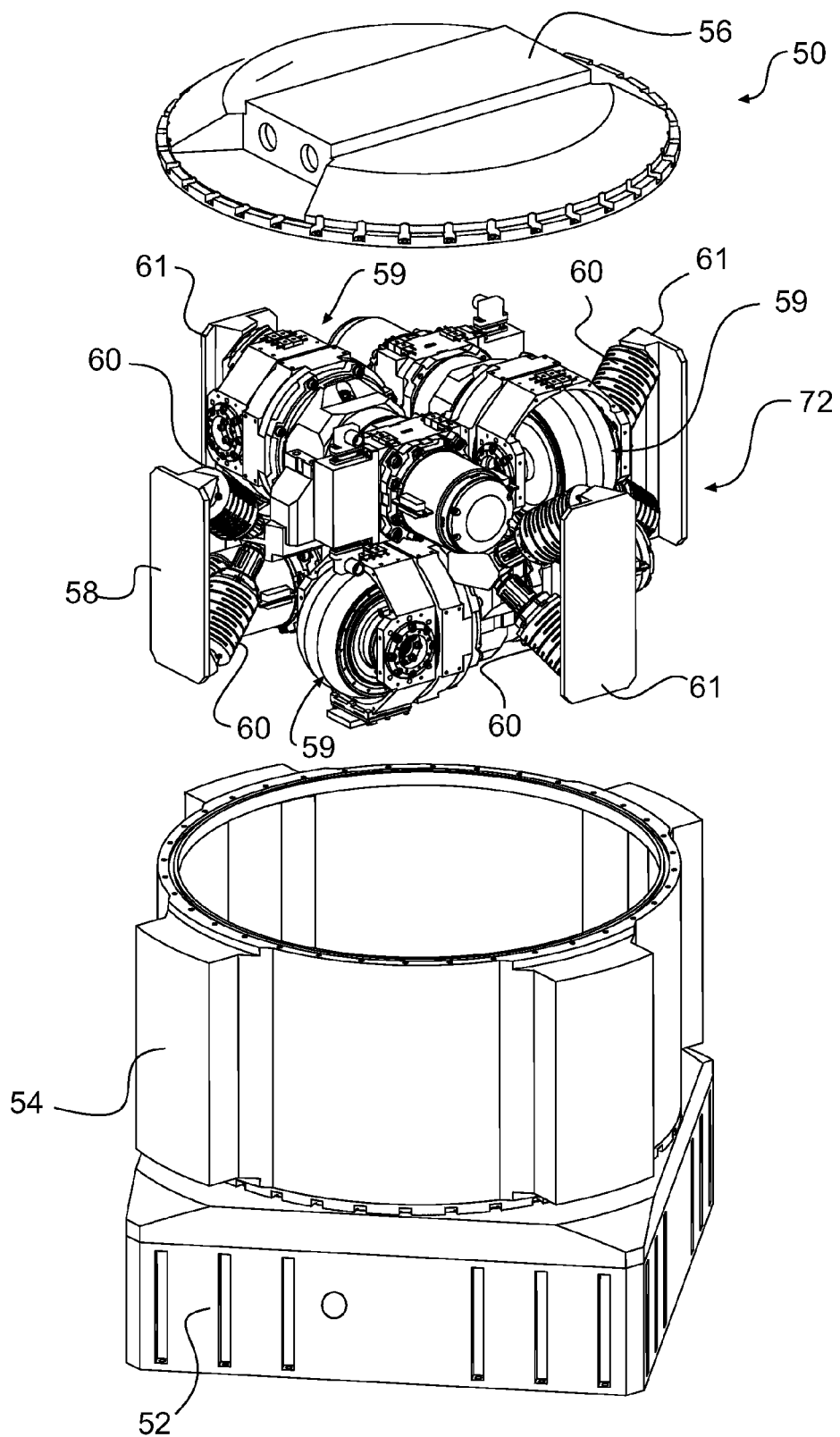
FIG. 1 is an exploded view of a momentum exchange assembly, according to an embodiment.

FIG. 1 is an exploded view of a momentum exchange assembly 50, according to an embodiment. The momentum exchange assembly 50 is configured to embody a momentum control system for controlling a spacecraft structure, such as a satellite or other spacecraft structure. Generally, the momentum exchange assembly 50 includes a base 52, a chassis 54, and a cover 56. The base 52, chassis 54, and cover 56 form a hermetically sealed outer housing that may be pressurized in an evacuated environment to contain a momentum exchange subsystem (MES) 58. In an embodiment, an inert gas, such as helium, may be used as a pressurizing gas. In other embodiments, other inert gases may be employed. In another embodiment, an interior of the sealed outer housing may be pressured to a pressurize in a range of about 0.05 barr to about 1.0 barr. In still other embodiments, the pressure of the gas may be greater or less than the aforementioned range.

According to an embodiment the MES 58 may comprise three or more control moment gyroscope assemblies (CMAs) 59 for spacecraft attitude control in three dimensions. In other embodiments, more CMAs may be utilized for back up, redundancy, singularity avoidance and other purposes. In an embodiment, the MES 58 includes four substantially identical control momentum assemblies (CMA) 59, a unitary support structure 72 securing the CMAs, and a plurality of shock isolators 60 and their attachment points 61. Each CMA 59 includes a CMG. The MES 58 may be secured to the momentum exchange assembly 50 via the unitary support structure 72 by the plurality of shock isolators 60, in an embodiment. Additional embodiments relating to the shock isolators 60 may be found in U.S. Pat. No. 5,918,865, U.S. Pat. No. 5,332,070, and U.S. Pat. No. 7,182,188, which are herein incorporated by reference in their entirety.

Figure 2:
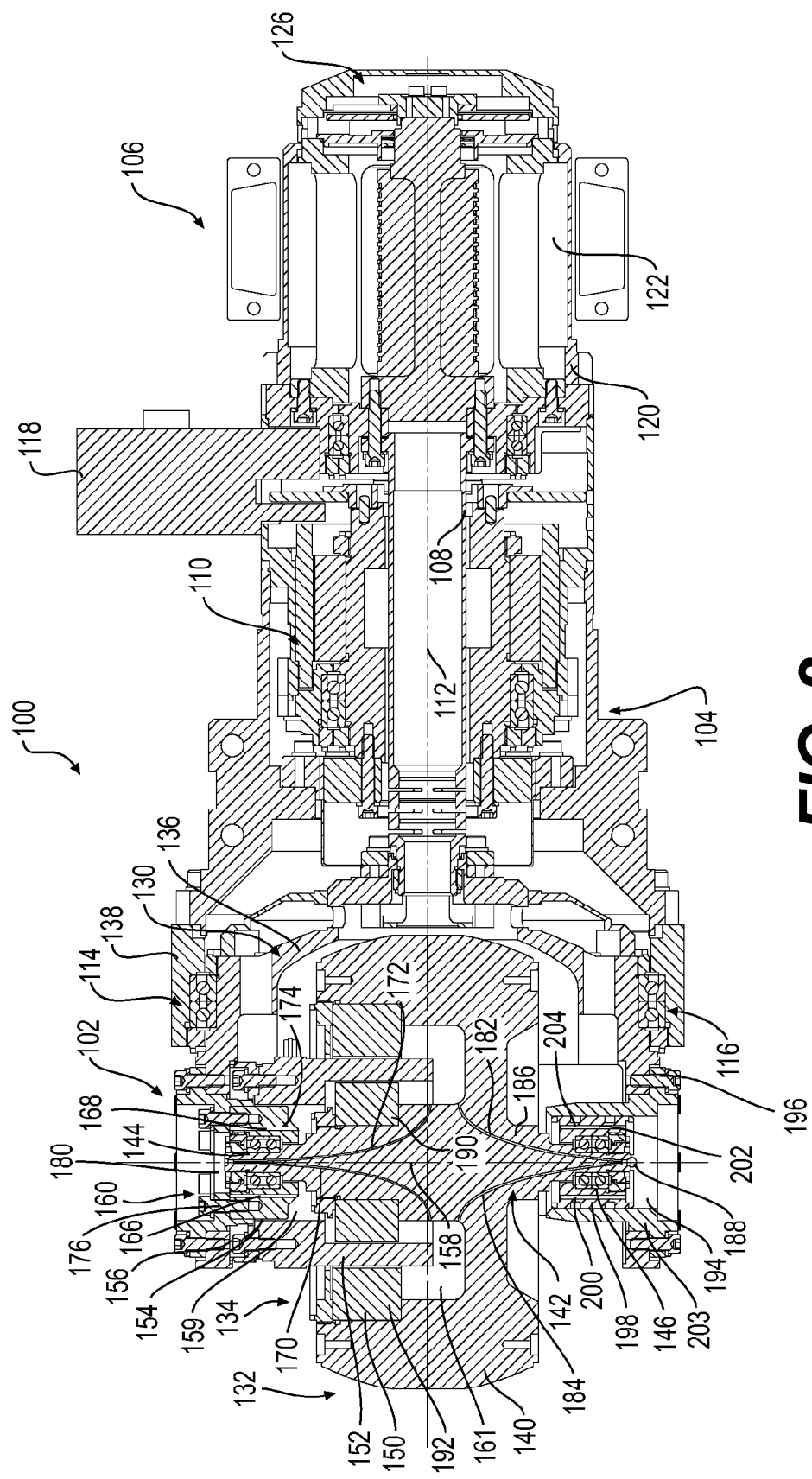
FIG. 2 is a cross-sectional side view of an assembled control moment gyroscope assembly, according to an embodiment.

FIG. 2 is cross-sectional side view of an assembled CMA 100, according to an embodiment. In an embodiment, the CMA 100 includes an inner gimbal assembly (IGA) 102, a torque module assembly (TMA) 104, and a signal module assembly (SMA) 106. The CMA 100 may be integrated and thus, the TMA 104 may be coupled to the IGA 102, and the SMA 106 may be coupled to the TMA 104. In an embodiment, the CMA 100 may form a single assembly through external structures of the IGA 102 and TMA 104, a harmonic drive between the TMA 104 and an output of the IGA 102, and a flexible cable conduit or a flexible spine 108 connecting the IGA 102 and SMA 106. In an embodiment, the flexible spine 108 may be milled from a single piece of steel bar stock. According to an embodiment, the flexible spine 108 may include one end having a spring-like configuration to accommodate a small amount of flex and expansion along a gimbal axis 112 of the CMA 100. In other embodiments, the flexible spine 108 may have a different configuration.

In an embodiment, a total axial length of the CMA 100 is in a range of about 314 millimeter (mm) to about 330 mm, and a widest diameter of the CMA 100 may be in a range of about 145 mm to about 160 mm. In accordance with another embodiment, the CMA 100 may be relatively small and may have a total axial length of about 28 centimeter (cm) and a widest diameter of about 10 cm in diameter. In other embodiments, the CMA 100 may be scaled to accommodate varying momentum and torque requirements and thus, may be longer or shorter in axial length or may be wider or narrower in diameter than the aforementioned ranges.

The TMA 104 is configured to selectively impart a gyroscopic torque to a host spacecraft. In this regard, the TMA 104 includes a torque motor 110 that selectively rotates the IGA 102 about a gimbal axis 112. To facilitate the rotation of IGA 102, gimbal bearings 114, 116 are disposed adjacent to the IGA 102. In another embodiment, the TMA 104 may be provided with a position sensor and/or a rate sensor (e.g., a resolver, a tachometer, etc.) suitable for motor commutation and/or for measuring the angular position or rotational rate of the IGA 102. In addition, and as shown in FIG. 1, an exterior of the TMA 104 may include a power transfer connector 118 to permit the TMA 104 to be connected to an external power source, such as a battery or the like.

The SMA 106 is configured to permit power and other electrical signals to be transferred across a rotary interface and to the electrical components of the IGA 102. In an embodiment, the SMA 106 includes a housing 120 containing an axial slip ring assembly 122. An exterior of the housing 120 may be coupled to the power transfer connector 118. According to an embodiment, the SMA 106 may include a gimbal axis potentiometer 126 mounted to an end of the SMA 106. The gimbal axis potentiometer 126 is employed to measure an angular position of the IGA 102. In an embodiment, a potentiometer power transfer connector (not shown) may be included on an exterior of the potentiometer 126 to allow connection to an external power source (not shown).

The IGA 102 is configured to rotate about the gimbal axis 112, in an embodiment. The IGA 102 comprises a gimbal housing assembly 130, a rotor assembly 132, and a spin motor 134. The gimbal housing assembly 130 provides a structure for supporting the rotor assembly 132. In an embodiment, the gimbal housing assembly 130 includes a gimbal retainer assembly 136 that is coupled to a stator housing 138, which in turn is coupled to the TMA 104. The gimbal retainer assembly 136 and the stator housing 138 are generally cylindrical allowing an output from the TMA 104 to extend through.

In accordance with an embodiment, the rotor assembly 132 includes an inertial element 140 (e.g., a ring or cylinder) fixedly coupled to a rotatable shaft 142. In accordance with an embodiment, the rotor assembly 132 may have a largest diameter in a range of about 100 mm to about 115 mm and a length in a range of about 95 mm to about 100 mm. In another embodiment, the largest diameter may be about four inches and the length may be about two and one half inches. In still other embodiments, the largest diameter and/or length but may be scaled in size as may be necessary for a particular application and thus, may be larger or smaller than the aforementioned ranges.

The spin motor 134 provides energy to rotate the rotor assembly 132 and is disposed around an intermediate portion of shaft 142. In an embodiment, the spin motor 134 includes a spin motor rotor 150 and a spin motor stator 152. The spin motor rotor 150 includes an inner ring 190 and an outer ring 192, in an embodiment. The inner ring 190 is coupled to the shaft 142, while the outer ring 192 is coupled to the inertial element 140. In an embodiment, the spin motor stator 152 is disposed around a portion of the spin motor rotor 150. In accordance with an embodiment, the spin motor stator 152 is coupled to and extends from the stator housing 130. In an example, the spin motor stator 152 is disposed in an annular gap between the inner and outer rings 190, 192 of the spin rotor 150. In some embodiments, the spin motor 146 may be a 3-phase, 4-pole DC motor with a non-ferric motor stator. In other embodiments, the spin motor 146 may comprise another type of motor.

To facilitate the rotational movement of rotor assembly 132, spin bearings 144, 146 are disposed around first and second ends 180, 188 of the shaft 142. One set of the spin bearings 144 radially inward from the spin motor 150 is held in place by a bearing cartridge 154, in an embodiment. According to an embodiment, the bearing cartridge 154 may be cylindrical and may be positioned within an attachment opening 156 formed through the stator housing 138. The bearing cartridge 154 surrounds the spin bearing 144 and rigidly holds the spin bearing 144 in place laterally against the shaft 142. Longitudinal movement of the spin bearing 144 may be accommodated by the flexing of the bearing cartridge 154 in a longitudinal direction along the spin axis 158. In an embodiment, the bearing cartridge 154 may be physically tuned (e.g. stiffened) by selecting different thicknesses and different material for fabrication. For example, the bearing cartridge 154 may comprise a beryllium copper metal and may have a radial thickness in a range of about 9 mm to about 12 mm. In another embodiment, the bearing cartridge 154 may comprise another material and/or may be thicker or thinner than the aforementioned range. In this way, the bearing cartridge 154 serves as a longitudinal vibration isolator for the rotor assembly 132 and accommodates thermal expansion of the rotor assembly 132.

A second set of spin bearings 146 are disposed at the second end 188 of the shaft 142 and held in place by a diaphragm 198. The diaphragm 198 is disposed within a bearing support sleeve 204, which may be disposed within an opening 196 in the stator housing 138, in an embodiment.

During operation, the rotor assembly 132 may spin at rotational rates at or greater than 23,000 rotations per minute (rpm). As a result of the rotation, the components of the CMG 100 (e.g., the spin bearings 144, 146) may produce heat, which may cause the temperature within the IGA 102 to exceed a threshold temperature. The threshold temperature may be a temperature at which the CMG component may have a reduced useful life, if exposed over a prolonged period of time during operation. According to an embodiment, a particular threshold temperature may depend on a material from which the CMG 100 components comprise. For example, a threshold temperature may be in a range of about 75° C. to about 100° C., and a suitable material may be selected for manufacturing the spin bearings 144, 146. In any case, to reduce the temperature within the IGA 102, a centrifugal pump may be included in the CMG 100. The centrifugal pump is configured to create a pressure differential between one or more cavities in the spin motor 134 and other sections of the IGA 102.

In an embodiment, a pressure differential is created between a first intermediary cavity 159 and an end cavity 160. In an embodiment, the first intermediary cavity 159 is defined by a first portion of an outer surface of the spin motor 134, a surface of the rotor assembly 132, and the first end 174 of the bearing cartridge 154. The end cavity 160 is partially defined by the second end 176 of the bearing cartridge 154 and the first end 180 of the shaft 142 and may be located in an attachment opening 156 of the stator housing 138, in an embodiment. In this regard, the centrifugal pump includes one or more cartridge channels 166, 168 extending between the end cavity 160 and the intermediary cavity 159. In an embodiment, one or more of the cartridge channels 166, 168 extends from the first end 174 of the bearing cartridge 154 to the second end 176. In accordance with an embodiment, the cartridge channels 166, 168 extend substantially parallel to the spin axis 158. In another embodiment, the cartridge channels 166, 168 are angled, either outwardly from or inwardly toward the spin axis 158. The cartridge channels 166, 168 may have a diameter in a range of about 1.0 mm to about 2.25 mm, in an embodiment. In another embodiment, the diameters may be larger or smaller than the aforementioned range. In accordance with an embodiment, two or more of the cartridge channels 166, 168 may have substantially equal diameters (e.g., ±0.1 mm). In another embodiment, two or more of the cartridge channels 166, 168 may have different diameters. Although two cartridge channels 166, 168 are shown in the bearing cartridge 154, more or fewer cartridge channels 166, 168 may be included.

Figure 3:
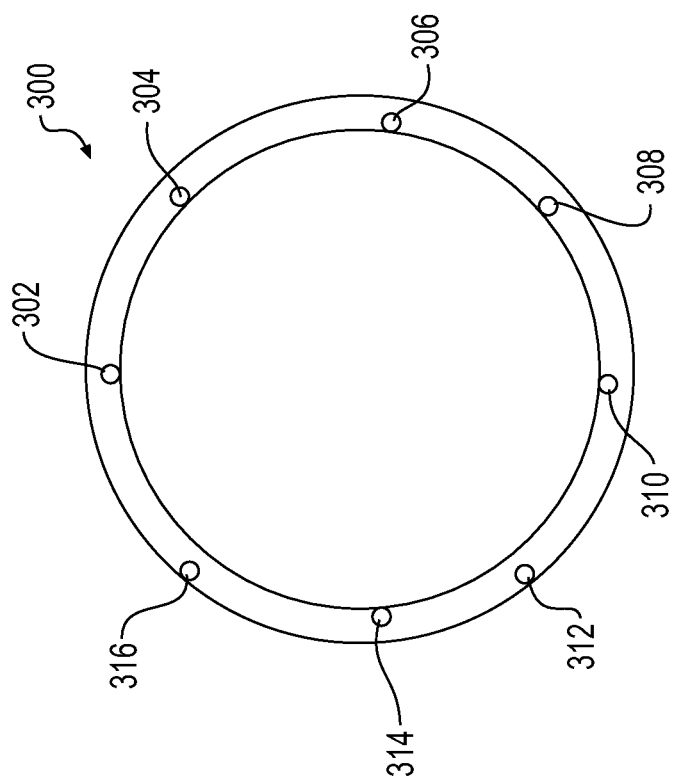
FIG. 3 is a radial cross section of a diaphragm, according to an embodiment.

FIG. 3 is a radial cross section of a cartridge 300, according to an embodiment. The cartridge 300 includes a plurality of cartridge channels 302, 304, 306, 308, 310, 312, 314, 316. In an embodiment, the cartridge channels 302, 304, 306, 308, 310, 312, 314, 316 are substantially evenly spaced around a circumference of the cartridge 300. In another embodiment, groups of diaphragm channels may be substantially evenly spaced around the diaphragm circumference. In still another embodiment, the diaphragm channels may not be evenly spaced around the diaphragm circumference. Although a total of eight cartridge channels 302, 304, 306, 308, 310, 312, 314, 316 are included in the cartridge 300 other embodiments may include fewer or more diaphragm channels. The cartridge channels 302, 304, 306, 308, 310, 312, 314, 316 may have a circular cross-section, in an embodiment. In another embodiment, the cross-section of the channels 302, 304, 306, 308, 310, 312, 314, 316 may not be circular. In still another embodiment, one or more of the cartridge channels 302, 304, 306, 308, 310, 312, 314, 316 may have a constant flow area along its length. In another embodiment, one or more of the cartridge channels 302, 304, 306, 308, 310, 312, 314, 316 may have a varied flow area along its length.

In another embodiment, the centrifugal pump is configured to create a pressure differential between the end cavity 160 and a second intermediary cavity 161 defined by a second portion of an outer surface of the spin motor 1348 and another portion of the surface of the rotor assembly 132. Thus, returning to FIG. 2, in another embodiment, the centrifugal pump alternatively or additionally includes shaft channels 170, 172. The shaft channels 170, 172 extend from the first end 180 of the shaft 142 to an intermediate section of the shaft 142 to provide flow communication between the second intermediary cavity 161 and the end cavity 160. In an embodiment, the shaft channels 170, 172 are straight channels, which are angled relative to the spin axis 158. In accordance with another embodiment, the shaft channels 170, 172 are relatively straight, but include a bend. According to an embodiment, the shaft channels 170, 172 may have a diameter in a range of about 0.8 mm to about 1.5 mm. In another embodiment, the diameters may be larger or smaller than the aforementioned range. In accordance with an embodiment, two or more of the shaft channels 170, 172 may have substantially equal diameters (e.g., ±0.1 mm). In another embodiment, two or more of the shaft channels 170, 172 may have different diameters. The shaft channels 170, 172 may have a circular cross-section, in an embodiment. In another embodiment, the cross-section of the shaft channels 170, 172 may not be circular. In still another embodiment, one or more of the shaft channels 170, 172 may have a constant flow area along its length. In another embodiment, one or more of the shaft channels 170, 172 may have a varied flow area along its length.

Figure 4:
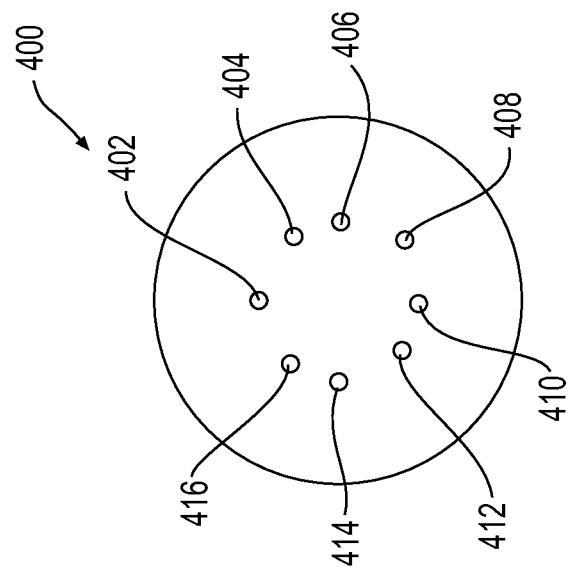
FIG. 4 is a radial cross section of a shaft, according to an embodiment.

FIG. 4 is a radial cross section of a shaft 400, according to an embodiment. The shaft 400 includes a plurality of shaft channels 402, 404, 406, 408, 410, 412, 414, 416. In an embodiment, the shaft channels 402, 404, 406, 408, 410, 412, 414, 416 are substantially evenly spaced around the shaft 400. For example, the shaft 400 may be a solid component, in an embodiment, and the shaft channels 402, 404, 406, 408, 410, 412, 414, 416 may form a circular pattern around the center of the shaft 400. In another embodiment, the shaft channels 402, 404, 406, 408, 410, 412, 414, 416 form a random pattern. In still another embodiment, the shaft 400 comprise a hollow component. In such an embodiment, the shaft channels 402, 404, 406, 408, 410, 412, 414, 416 are substantially evenly spaced around a circumference of the shaft 400. In still another embodiment, the shaft channels 402, 404, 406, 408, 410, 412, 414, 416 form groups and the groups are substantially evenly spaced around the diaphragm circumference. In still another embodiment, the shaft channels are not evenly spaced around the shaft circumference. Although a total of eight shaft channels 402, 404, 406, 408, 410, 412, 414, 416 are included in the shaft 400 other embodiments may include fewer or more shaft channels.

Returning to FIG. 2, in still yet another embodiment, the centrifugal pump includes a cooling mechanism to reduce operating temperatures of the spin bearings 146 proximate the second end 188 of the shaft 142. In this regard, the centrifugal pump alternatively or additionally includes shaft channels 184, 186 extending from the second end 188 of the shaft 142 to an intermediate section of the shaft 142. The shaft channels 184, 186 provide flow communication between another, second end cavity 194 and the intermediary cavity 161. The second end cavity 194 is defined at least partially by the second end 188 of the shaft 188 and is located within stator opening 196 in the stator housing 138, in an embodiment. In an embodiment, the shaft channels 184, 186 may curve from the shaft end 188 to the intermediate section surface. In another embodiment, the shaft channels 184, 186 may be straight channels, which are angled relative to the spin axis 158. According to an embodiment, the shaft channels 184, 186 may have a diameter in a range of 0.8 mm to about 1.5 mm, in an embodiment. In another embodiment, the diameters may be larger or smaller than the aforementioned range. In accordance with an embodiment, two or more of the shaft channels 184, 186 may have substantially equal diameters (e.g., ±0.1 mm). In another embodiment, two or more of the shaft channels 184, 186 may have different diameters. The shaft channels 184, 186 may have a circular cross-section, in an embodiment. In another embodiment, the cross-section of the shaft channels 184, 186 may not be circular. In still another embodiment, one or more of the shaft channels 184, 186 may have a constant flow area along its length. In another embodiment, one or more of the shaft channels 184, 186 may have a varied flow area along its length.

In an embodiment in which shaft channels 170, 172, 184, 186 are included extending from both ends 180, 188 of the shaft 142, all of the shaft channels 170, 172, 184, 186 are substantially equal in diameter. In other embodiments, some shaft channels 170, 172 are larger or smaller than the other shaft channels 184, 186.

In another embodiment, diaphragm channels 200, 202 are included through the diaphragm 198 surrounding the second set of spin bearings 146. The diaphragm channels 200, 202 extend substantially parallel to the spin axis 158, in an embodiment. In another embodiment, the diaphragm channels 200, 202 are angled, either outwardly from or inwardly toward the spin axis 158. The diaphragm channels 200, 202 may have a diameter in a range of about 1.0 mm to about 2.25 mm, in an embodiment. In another embodiment, the diameters may be larger or smaller than the aforementioned range. In accordance with an embodiment, two or more of the diaphragm channels 200, 202 are substantially equal in diameter (e.g., ±0.1 mm). In another embodiment, two or more of the diaphragm channels 200, 202 have different diameters. Although two diaphragm channels 200, 202 are shown in the diaphragm 198, more or fewer diaphragm channels 200, 202 may be included.

In an embodiment in which cartridge channels 166, 168, 200, 202 are included in both the cartridge 154 and the diaphragm 198, all of the cartridge and diaphragm channels 166, 168, 200, 202 may be substantially equal in diameter. In other embodiments, some of the cartridge and diaphragm channels 166, 168, 200, 202 may be larger or smaller than the other cartridge and diaphragm channels 166, 168, 200, 202.

Figure 5:
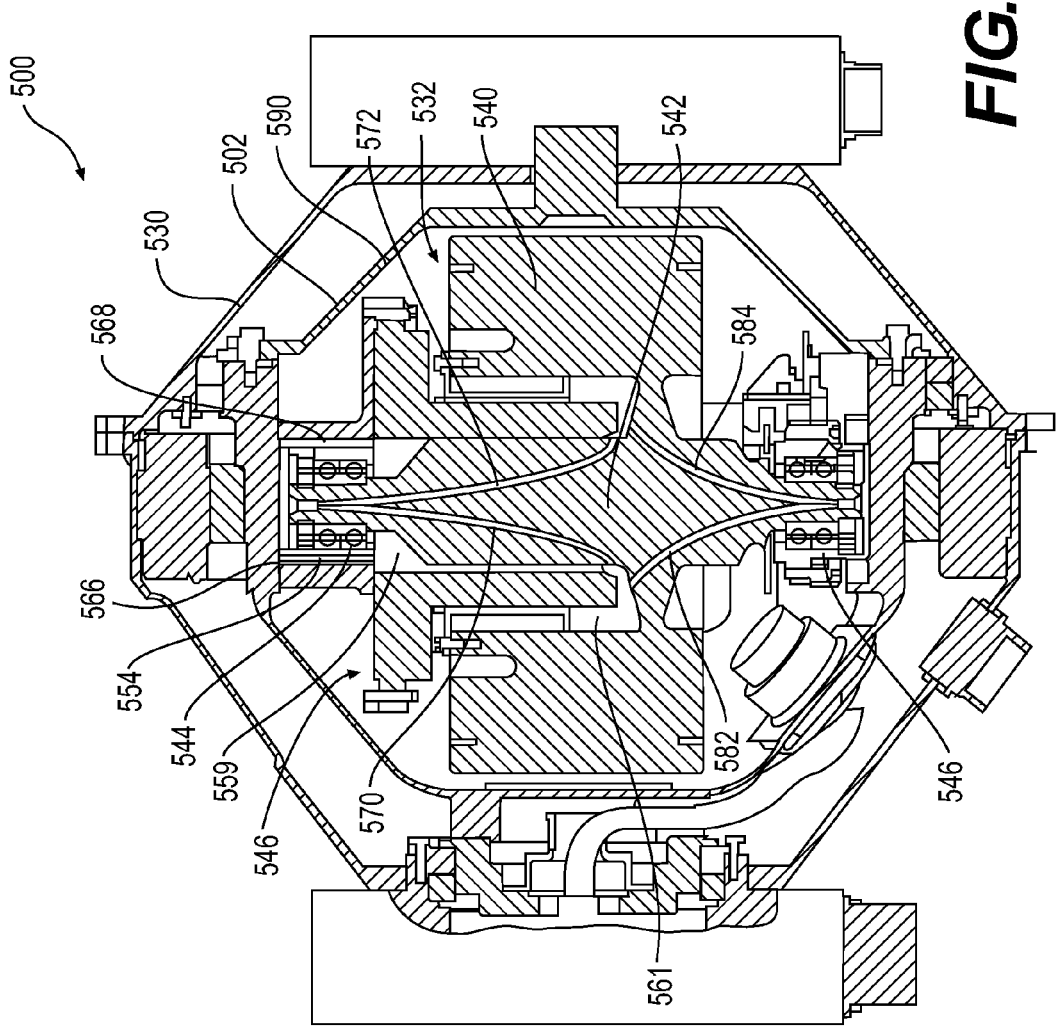
FIG. 5 is a control moment gyroscope assembly (CMA), according to another embodiment.

The centrifugal pump may be included in various types of control moment gyroscope assemblies. FIG. 5 is a control moment gyroscope assembly (CMA) 500, according to another embodiment. Here, the CMA 500 includes an inner gimbal assembly (IGA) 502; however the IGA 502 is enclosed in a stator housing 530. The stator housing 530 may have a total axial length in a range of about 25 cm to about 30 cm and a largest diameter in a range of about 17 cm to about 20 cm, in an embodiment. In other embodiments, the axial length and largest diameter of the stator housing 530 may be greater or less than the aforementioned ranges.

According to an embodiment, the stator housing 530 is hermetically sealed to allow the IGA 502 to be pressurized and to operate in an evacuated environment. In an embodiment, an inert gas, such as helium, may be used as a pressurizing gas. In other embodiments, other inert gases may be employed. In another embodiment, an interior of the stator housing 530 may be pressurized to a pressure in a range of about 0.3 barr to 1.0 barr. In still other embodiments, the pressure of the gas may be greater or less than the aforementioned range.

The IGA 502 further may be disposed in an IGA housing 590, which may or may not be sealed. In an embodiment, the IGA 502 includes a rotor assembly 532 that includes an inertial element 540 (e.g., a ring or cylinder) fixedly coupled to a rotatable shaft 142. The rotor assembly 532 has an axial length in a range of about 10 cm and about 17 cm and a largest diameter in a range of about 5 cm to about 8 cm, in an embodiment. In other embodiments, the axial length and largest diameter of the rotor assembly 532 may be greater or less than the aforementioned ranges. To facilitate the rotational movement of rotor assembly 532, spin bearings 544, 546 are disposed around each end of the shaft 542. At least one of the spin bearings 544, 546 is held in place by a cartridge 554, in an embodiment. A spin motor 546 is disposed around an intermediate portion of shaft 542 and defines intermediary cavities 559, 561 with different sections of the rotor assembly 532. In an embodiment, the spin motor 546 is attached to a portion of the IGA housing 530.

To cool components within the IGA 502, one or more cartridge channels 566, 568 and/or shaft channels 570, 572, 582, 584 may be included to form the centrifugal pump. In an embodiment, the cartridge channels 566, 568 extend through the cartridge 554 to provide communication between an end cavity (not shown) and the intermediary cavity 559 and are configured and/or disposed in a manner similar to cartridge channels 166, 168. In another embodiment, the shaft channels 570, 572, 582, 584 extend from one or both end cavities (not shown) on either ends of the shaft 542 to the intermediary cavity 561. The shaft channels 570, 572, 582, 584 are configured and/or disposed in a manner similar to shaft channels 170, 172, 182, 184 described above.

With reference to FIGS. 2 and 5, during operation, when the CMG 100, 500 is energized, the spin motor 146, 546 imparts torque to the shaft 142, 542 to rotate the rotor assembly 132, 532 about the spin axis 158. During the course of CMG operation, the spin bearings 144, 146, 544, 546 may produce heat. By including one or more of the cartridge and/or diaphragm channels 166, 168, 184, 186, 566, 568, 582, 584 and/or shaft channels 170, 172, 570, 572, 582, 584 in the CMG 100, 500, the spin bearings 144, 146, 544, 546 and surrounding components may remain relatively cool. Specifically, a pressure differential may be created between the intermediary cavity 159, 161, 559, 561 and end cavities 160, 194 when the rotor assembly 132, 532 rotates. As a result, gas within the CMG 100, 500 may flow through the channels 166, 168, 184, 186, 566, 568, 582, 584, which may increase convection to encourage heat transfer from the spin bearings 144, 146, 544, 546.

Hence, an improved CMG is provided that has a cooling system that may maintain an interior temperature of the CMG below a threshold temperature. Additionally, the CMG may have a relatively low overall weight. The cooling system included in the CMG may also occupy a minimal portion of the CMG interior volume. Moreover, the improved CMG may be relatively simple and inexpensive to manufacture compared to conventional CMGs.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A momentum exchange assembly, comprising:
an outer housing; and
an inner gimbal assembly disposed within the outer housing, the inner gimbal assembly including:
a stator housing;
a rotor assembly disposed at least partially within the stator housing, the rotor assembly including a shaft and an inertial element fixedly coupled to the shaft;
a first spin bearing mounted to a first end of the shaft;
a bearing cartridge surrounding the first spin bearing, the bearing cartridge having a first end, a second end, and a bearing cartridge channel extending from the first end of the bearing cartridge to the second end of the bearing cartridge; and
a spin motor disposed within the stator housing and around the shaft, the spin motor including a spin motor rotor and a spin motor stator, the spin motor rotor coupled to the rotor assembly, and the spin motor stator disposed around a portion of the spin motor rotor and coupled to the stator housing,
wherein:
a first end cavity is partially defined by the first end of the bearing cartridge,
a first intermediary cavity is defined by a first portion of an outer surface of the spin motor, a first portion of a surface of the rotor assembly, and the second end of the bearing cartridge, and
the bearing cartridge channel provides flow communication between the first end cavity and the first intermediary cavity.

2. The momentum exchange assembly of claim 1, further comprising:
a second spin bearing mounted to a second end of the shaft;
a diaphragm disposed around the second spin bearing; and
a diaphragm channel extending through the diaphragm.

3. The momentum exchange assembly of claim 1, wherein the bearing cartridge comprises a plurality of bearing cartridge channels extending from the first end of the bearing cartridge to the second end of the bearing cartridge.

4. The momentum exchange assembly of claim 3, wherein the plurality of bearing cartridge channels are substantially evenly spaced around the bearing cartridge.

5. The momentum exchange assembly of claim 1, wherein:
the shaft includes a plurality of shaft channels extending through the shaft;
a second intermediary cavity is defined by a second portion of the outer surface of the spin motor and a second portion of the surface of the rotor assembly; and
the plurality of shaft channels provides flow communication between the first end cavity and the second intermediary cavity.

6. The momentum exchange assembly of claim 5, wherein the plurality of shaft channels are substantially evenly spaced around the shaft.

7. The momentum exchange assembly of claim 1, wherein:
the shaft includes a first shaft channel extending through the shaft;
a second intermediary cavity is defined by a second portion of the outer surface of the spin motor and a second portion of the surface of the rotor assembly; and
the first shaft channel provides flow communication between the first end cavity and the second intermediary cavity.

8. The momentum exchange assembly of claim 7, wherein the first shaft channel curves from the first end cavity to the second intermediary cavity.

9. The momentum exchange assembly of claim 7, wherein:
the first end of the shaft is disposed proximate to the bearing cartridge;
a second end cavity is partially defined by a second end of the shaft; and
the shaft includes a second shaft channel extending through the shaft to provide flow communication between the second end cavity and the second intermediary cavity.

10. A momentum exchange assembly, comprising:
an outer housing; and
an inner gimbal assembly disposed within the outer housing, the inner gimbal assembly including:
a stator housing;
a rotor assembly disposed at least partially within the stator housing, the rotor assembly including a shaft and an inertial element fixedly coupled to the shaft;
a spin bearing mounted to a first end of the shaft;
a bearing cartridge surrounding the spin bearing, the bearing cartridge having a first end and a second end; and
a spin motor disposed within the stator housing and around the shaft, the spin motor including a spin motor rotor and a spin motor stator, the spin motor rotor including an inner ring and an outer ring, the inner ring coupled to the shaft, the outer ring coupled to the inertial element, and the spin motor stator disposed in an annular gap between the inner ring and the outer ring and coupled to the stator housing,
wherein:
a first end cavity is partially defined by the first end of the bearing cartridge,
the shaft includes a first shaft channel extending through the shaft,
a first intermediary cavity is defined by a first portion of an outer surface of the spin motor and a first portion of a surface of the rotor assembly, and
the first shaft channel provides flow communication between the first end cavity and the first intermediary cavity.

11. The momentum exchange assembly of claim 10, wherein:
the first end of the shaft is disposed proximate to the bearing cartridge;
a second end cavity is partially defined by a second end of the shaft; and
the shaft includes a second shaft channel extending through the shaft to provide flow communication between the second end cavity and the second intermediary cavity.

12. The momentum exchange assembly of claim 10, wherein:
the shaft includes a plurality of shaft channels extending through the shaft;
a second intermediary cavity is defined by a second portion of the outer surface of the spin motor and a second portion of the surface of the rotor assembly; and
the plurality of shaft channels provides flow communication between the first end cavity and the second intermediary cavity.

13. The momentum exchange assembly of claim 12, wherein the plurality of shaft channels are substantially evenly spaced around the shaft.

14. An inner gimbal assembly for use in a control moment gyroscope assembly and of the type that includes a stator housing and a spin motor disposed within the stator housing and on a shaft, the inner gimbal assembly comprising:
a first spin bearing mounted to the shaft; and
a bearing cartridge substantially surrounding the first spin bearing, the bearing cartridge having a first end partially defining a first end cavity, a second end partially defining a first intermediary cavity, and a bearing cartridge channel providing flow communication between the first end cavity and the first intermediary cavity,
wherein the inner gimbal assembly is disposed within an outer housing.

15. The inner gimbal assembly of claim 14, wherein the bearing cartridge comprises a plurality of bearing cartridge channels extending from the first end of the bearing cartridge to the second end of the bearing cartridge.

16. The inner gimbal assembly of claim 14, wherein
a second intermediary cavity is partially defined by the spin motor and the shaft; and
the shaft includes a first shaft channel providing flow communication between the first end cavity and the second intermediary cavity.

17. The inner gimbal assembly of claim 16, wherein:
the shaft includes a second shaft channel providing flow communication between the second intermediary cavity and a second end cavity at least partially defined by an end of the shaft opposite the bearing cartridge.

18. The inner gimbal assembly of claim 14, wherein:
a second intermediary cavity is partially defined by the spin motor and the shaft; and
the shaft includes a plurality of shaft channels providing flow communication between the first end cavity and the second intermediary cavity.

19. The inner gimbal assembly of claim 14, further comprising:
a second spin bearing mounted to the shaft;
a diaphragm substantially surrounding the second spin bearing, the diaphragm having a diaphragm channel.

20. The inner gimbal assembly of claim 14, further comprising:
a torque module assembly coupled to the inner gimbal assembly.

* * * * *